United States Patent
Delmoro et al.

(10) Patent No.: US 7,552,630 B2
(45) Date of Patent: Jun. 30, 2009

(54) LOAD WHEEL DRIVE

(75) Inventors: Richard Delmoro, Tallmadge, OH (US);
David Krause, Hartville, OH (US);
David Poling, Sr., Akron, OH (US)

(73) Assignee: Akron Special Machinery, Inc., Akron, OH (US)

( * ) Notice: Subject to any disclaimer, the term of this patent is extended or adjusted under 35 U.S.C. 154(b) by 549 days.

(21) Appl. No.: 11/508,408

(22) PCT Filed: Feb. 28, 2005

(86) PCT No.: PCT/US2005/006468

§ 371 (c)(1),
(2), (4) Date: Aug. 22, 2006

(87) PCT Pub. No.: WO2005/084282

PCT Pub. Date: Sep. 15, 2005

(65) Prior Publication Data

US 2007/0017324 A1    Jan. 25, 2007

Related U.S. Application Data

(60) Provisional application No. 60/548,291, filed on Feb. 27, 2004.

(51) Int. Cl.
*G01M 17/02* (2006.01)

(52) U.S. Cl. .......................................... 73/146; 451/1

(58) Field of Classification Search ................... 73/146; 451/1
See application file for complete search history.

(56) References Cited

U.S. PATENT DOCUMENTS

| | | | | |
|---|---|---|---|---|
| 3,963,427 A * | 6/1976 | Ugo | ............................... | 451/1 |
| 4,041,647 A * | 8/1977 | Ugo | ........................... | 451/254 |
| 4,095,374 A * | 6/1978 | Ugo | ............................... | 451/1 |
| 4,736,546 A * | 4/1988 | Ugo | ........................... | 451/254 |
| 5,022,186 A * | 6/1991 | Rogers, Jr. | ...................... | 451/1 |
| 6,016,695 A * | 1/2000 | Reynolds et al. | ............... | 73/146 |
| 6,584,877 B1 * | 7/2003 | Poling et al. | ................... | 82/101 |
| 6,786,800 B1 * | 9/2004 | Delmoro et al. | ................ | 451/11 |
| 6,892,612 B2 * | 5/2005 | Poling et al. | ................... | 82/101 |
| 2008/0108283 A1 * | 5/2008 | Poling et al. | ................ | 451/258 |

* cited by examiner

*Primary Examiner*—Andre J Allen
(74) *Attorney, Agent, or Firm*—Renner, Kenner, Greive, Bobak, Taylor & Weber

(57) ABSTRACT

A method of positioning a load wheel in a tire uniformity machine to load a tire for testing, the method comprising providing a drive assembly including a drive motor and a drive controller, electrically connected to each other, said drive controller being adapted to switch between analog velocity control and position control; moving the load wheel with the drive motor using analog velocity control; and switching to position control to cause said motor to maintain a selected position of said load wheel without a mechanical brake.

13 Claims, 4 Drawing Sheets

LOAD WHEEL DRIVE

RELATED PATENT APPLICATIONS

This application claims the benefit of U.S. Provisional Application No. 60/548,291 filed on Feb. 27, 2004.

TECHNICAL FIELD

In general, the present invention relates to tire uniformity machines. In particular, the present invention relates to the load wheel drive in a tire uniformity machine. More particularly, the present invention relates to a load wheel drive having a servo motor connected to a gear reduction that drives the load wheel and eliminates the need for a brake motor.

BACKGROUND OF THE INVENTION

Tire uniformity machines are well known in the art. In general, these machines test characteristics of a tire by placing the tire on a chuck and contacting it with a rotating load wheel that is equipped with load cells to measure characteristics of the tire. Typically, the load wheel is in a retracted position while the tire is being conveyed into the machine and mounted on the chuck. In this retracted position, the load wheel is moved laterally outward relative to the chuck assembly until the load wheel is more or less outside of the machine proper. Once the tire has been chucked, the load wheel is driven inwardly to contact the tire. The position of the load wheel relative to the tire is important in terms of applying a specified load to the tire and ensuring accurate test results.

In one known system, the motion of the load wheel is controlled by a D.C. motor via a 15:1 gear box reduction and a 54 T-23T chain-sprocket drive increase with a resulting reduction of 6.39:1 to a 0.25 inch pitch ball screw. The maximum speed of such a system is about 1.1 inches per second. Loading is accomplished by using a 4-quadrant D.C. drive that controls the velocity of the load wheel carriage. Using the velocity controlled method, the load wheel is initially advanced at full speed until its load cells detect an increase in the instantaneous load. When the measured load is within 200 pounds of a set point load, the analog velocity set point to the D.C. drive is reduced as the "load error" decreases. In this system, it is necessary to load to an average radial force, which is calculated over one or more revolutions of the tire. When the load is within the desired tolerance, the drive motor is disabled and a mechanical brake is engaged to maintain the final position of the load wheel.

In existing systems, the mechanical brake mechanism has been a critical component. During loading, the electrically released brake mechanism must fully release or else it can prevent proper loading and can cause excessive brake wear. At the end of the loading cycle, the brake release mechanism is de-energized and the brake must fully resist the back driving force generated by a loaded tire. Even a small amount of brake slippage results in degraded measurement results for the tire uniformity machine.

SUMMARY OF THE INVENTION

In light of the foregoing, it is an object of the present invention to provide an improved load wheel drive system.

In light of this object, the present invention generally provides a load drive motor assembly that is retrofit to a conventional load wheel drive having a gear box and ball screw assembly connected to each other by a chain, the load drive motor assembly, including a servo motor; an adapter plate fastenable to the gear box on one side and fastenable to the servo motor on the other side; and wherein the servo motor is switchable between analog velocity control and a fixed position control; an enable relay connected to the servo drive, the enable relay having an energized state and a de-energized state, wherein the energized state switches the servo-drive to the analog velocity control, and wherein the de-energized state switches the servo drive to the fixed position control being adapted to maintain a current position of the load wheel.

The present invention further provides a method of retrofitting a servo motor to a load wheel drive having a dc motor, gear box, and motor controls the method including removing the dc motor; attaching an adapter to the gear box, providing receivers on the adapter that align with receivers on the servo motor; fastening the servo motor to the adapter plate at the aligned receivers; connecting the servo motor to the motor controller at a relay on the servo motor; programming the relay to cause the servo motor to hold a position if the relay is de-energized.

The present invention further provides a load wheel drive assembly for an existing tire uniformity machine having a load wheel that is driven by a ball nut connected to a gear box, the load wheel drive assembly including a servo motor attachable to the gear box and operable therewith to control movement of the load wheel, the servo motor having a relay adapted to switch the servo motor between a velocity mode and a position mode of operation.

The present invention further provides a load wheel drive assembly that is retrofit to a conventional load wheel drive having a gear box that interconnects with a ball screw used to drive a load wheel, wherein movement of the load wheel is controlled by a controller that receives force feedback from at least one load cell associated with the load wheel, the load wheel drive assembly including a servo motor attachable to the gear box and operatively connected therewith; a drive controller electrically connected to the controller and the servo motor, the drive controller having at least one programmable input adapted to switch operation of the servo motor between analog velocity control and position control, wherein the servo motor drives the load wheel at an average velocity when in the analog velocity control mode and wherein the servo motor maintains a selected position when in the position control mode; wherein the programmable input is in communication with the controller and is programmed to switch to position control upon receiving a signal from the controller indicating that the load wheel is in a selected position, whereby the servo motor being in a position control mode holds the selected position.

The present invention further provides a method of positioning a load wheel in a tire uniformity machine to load a tire for testing, the method including providing a drive assembly including a drive motor and a drive controller, electrically connected to each other, the drive controller being adapted to switch between analog velocity control and position control; moving the load wheel with the drive motor using analog velocity control; and switching to position control to cause the motor to maintain a selected position of the load wheel without a mechanical brake.

BRIEF DESCRIPTION OF THE DRAWINGS

For a complete understanding of the objects, techniques and structure of the invention, reference should be made to the following detailed description and accompanying drawings wherein.

DETAILED DESCRIPTION OF THE INVENTION

Figure 1:
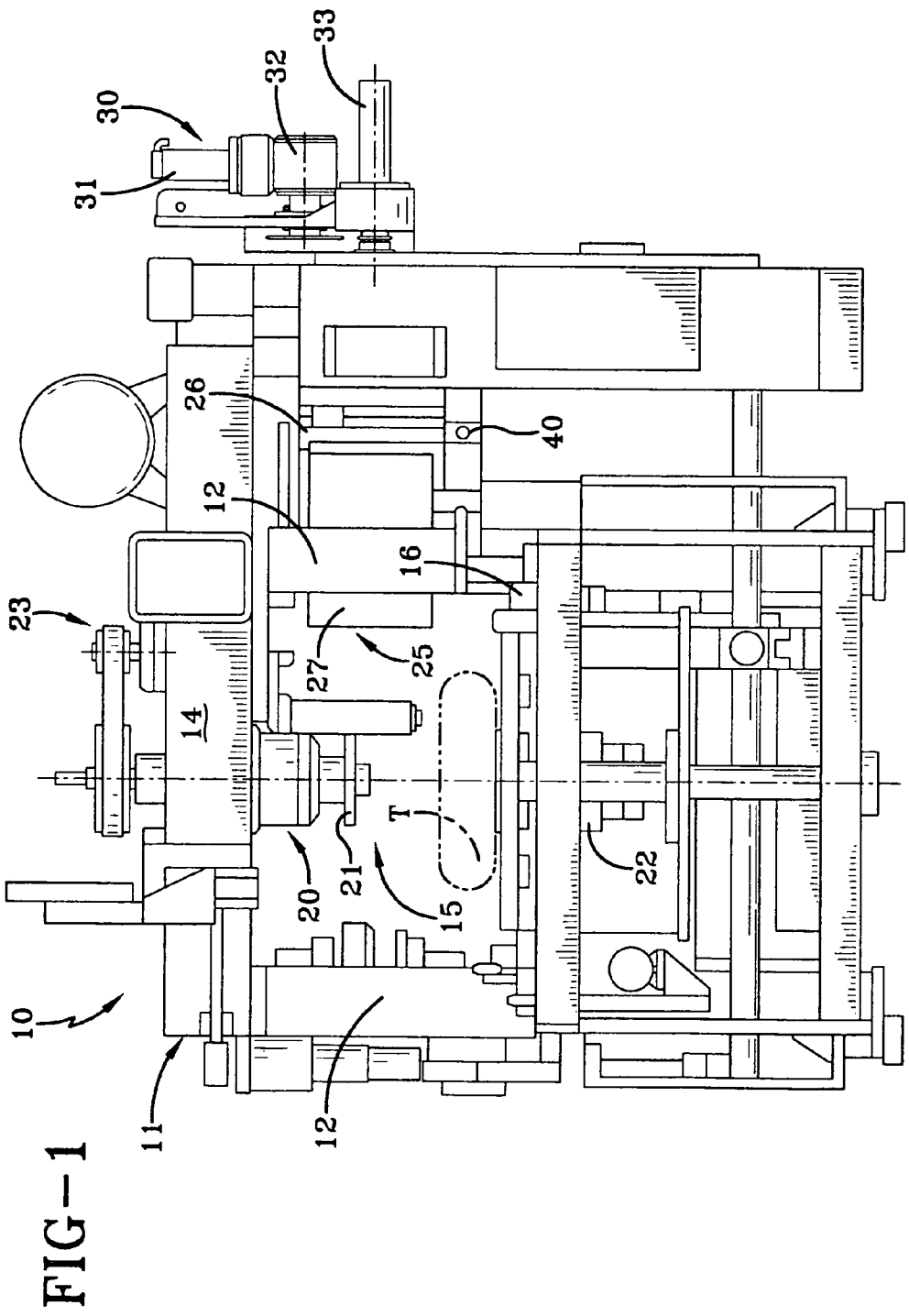
FIG. 1 is a front side elevational view of a tire uniformity machine having a load wheel drive system according to the present invention.
Figure 2:
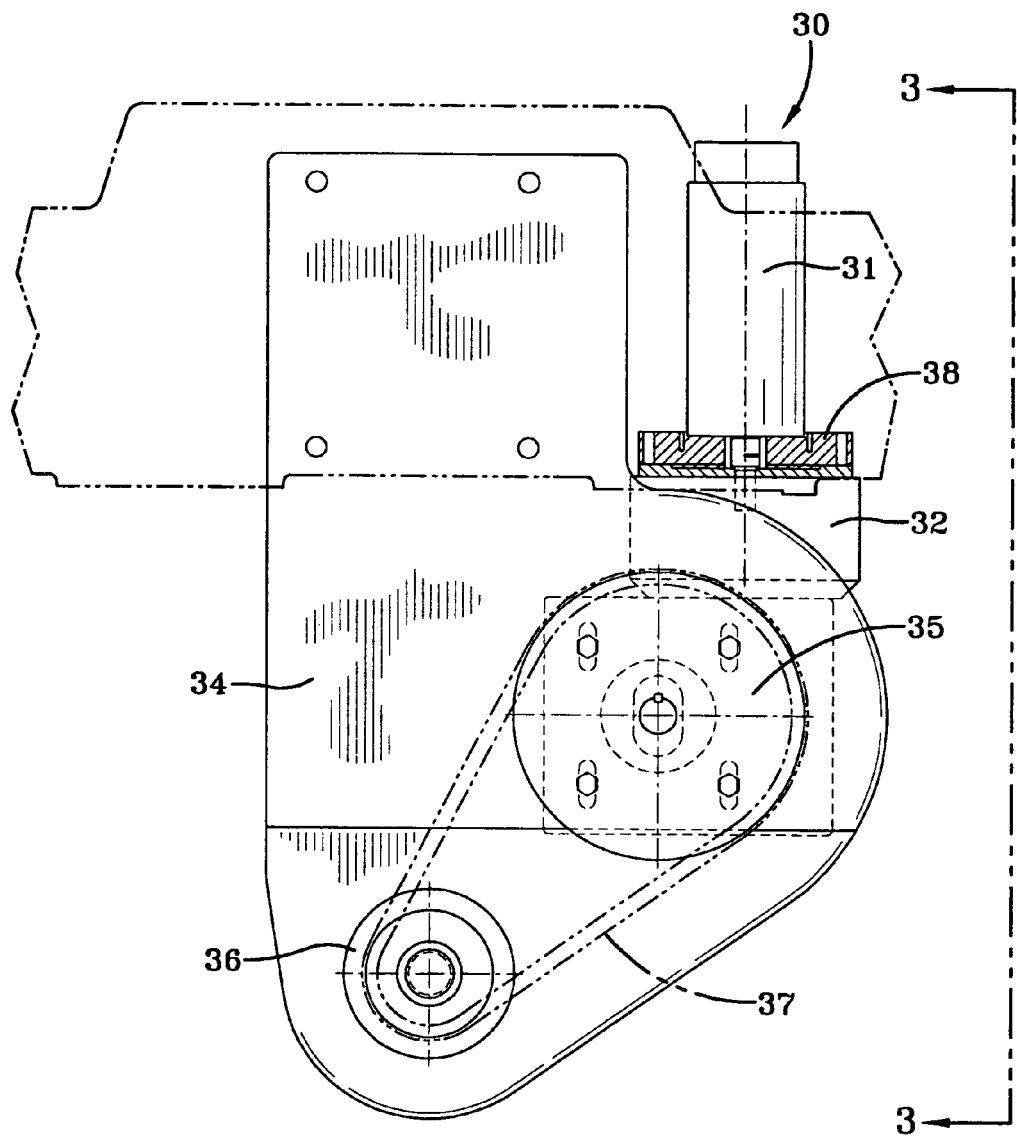
FIG. 2 is an enlarged side elevational view as might be seen along line 2-2 in FIG. 1, partially sectioned to show details of a servo drive load wheel drive assembly.
Figure 3:
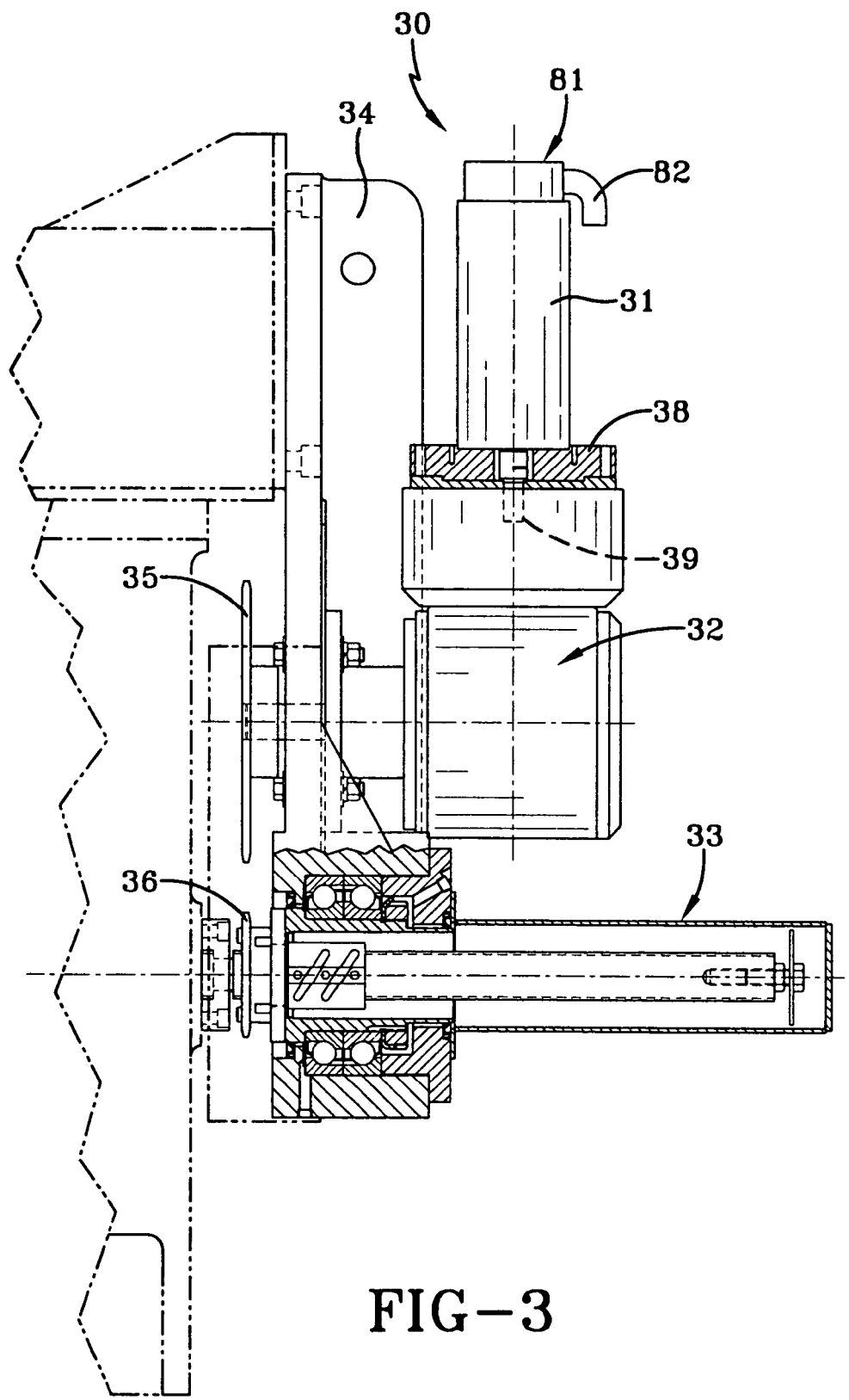
FIG. 3 is a side elevational view as might be seen along line 3-3 in FIG. 2.

A tire uniformity machine according to the concepts of the present invention is generally indicated by the numeral 10. The basic components of the tire uniformity machine are familiar to the those of ordinary skill in the art, and, thus, will be described in general terms only. A tire uniformity machine 10 includes a box-like frame 11 having a plurality of upstanding members 12 capped by a top frame member 14 defining the machine proper, generally indicated by the numeral 15, therein. A first conveyor 16 brings tires into the machine proper 15 where they are chucked on a chuck assembly, generally indicated by the numeral 20. After the tire T has been tested, an exit conveyor carries the tire T from the machine proper 15 to downstream applications.

The chuck assembly 20 may include two halves 21, 22 that clamp the tire T from either side in preparation for testing. The chuck assembly 20 is rotatable and a motor 23 may be used to rotate the chuck assembly 20.

A load wheel assembly, generally indicated by the numeral 25 is located to one side of the machine proper 15 and is mounted on a carriage 26 that allows the load wheel to be driven inward toward the center C of the machine proper 15. In this way, the road surface 27 of the load wheel 25 may be brought into contact with the tread portion of the tire T. The load wheel 25 may be freely rotatable such that rotation of the tire T causes the load wheel 25 to rotate. It will be appreciated that instead of driving the chuck assembly 20, the load wheel 25 may be driven with a freely rotatable chuck assembly 20. Once testing is complete, the load wheel 25 is retracted clearing the machine proper 15 for the next tire T.

Movement of the load wheel 25 into and out of the machine proper 15 is performed by a load wheel drive, generally indicated by the numeral 30. Load wheel drive 30 is generally located adjacent the load wheel carriage 26 and in operable contact therewith to move the load wheel 25 into and out of contact with the tire T. The load wheel drive 30 generally includes a motor 31, which may be a servo motor, as shown, a gear box 32 operatively connected with the motor 31, and a ball screw 33 that is operatively connected with the gear box 32. The gear box 32 typically performs a gear reduction to provide a mechanical advantage to the motor 31. The gear box 32 may also provide a change in the direction of rotation. In the example shown, the gear box 32 provides a 90° change in the direction of the rotation. As will be understood, rotation of a motor shaft of the motor 31 causes the ball screw 33 to rotate clockwise do counterclockwise depending on the direction of rotation of the shaft of the motor 31 causing the ball screw 33 to advance or retract the load wheel 25. Movement of the load wheel 25 may be controlled according to any method known in the art including, for example, the position-based method described in U.S. Pat. No. 6,578,275, which is incorporated herein by reference. In particular, when a tire T enters the machine proper 15 and is chucked, load wheel drive 30 positions the load wheel 25 in an initial load position (WLP). This position may be determined in a variety of ways. The initial load position may be calculated before testing and manually entered. Alternatively, when a single tire or a number of tires (one or more) of the same type have previously been tested, a final position of the last tire of the same type may be used as the initial load position for the present tire. Or, an historical average of previous tires of the same or similar type may be used to determine the initial load position.

With the initial load position determined, the load wheel drive 30 makes an initial move (IM) to the initial load position. Since the load wheel drive 30 is moving the carriage and load wheel 25 to a set position, this move may occur at relatively high speed, or, in other words greater than a one inch per second move typically performed in the art. Using the Indramat™ servo motor as an example, moves of up to about 4 to about 6 inches per second may be attained. It will be appreciated that substitution of other drive systems may permit moves at other speeds including speeds greater than 6 inches per second.

Once the load wheel 25 is in the initial load position, an average radial load (ARL) is computed from the feedback from the load wheel sensors. If the average radial load is within a selected tolerance, the load sequence is over. Otherwise, the load wheel drive 30 makes a corrective move (CM) to bring the average radial load within the tolerated level.

In performing the corrective move, the controller calculates a target offset position (TOP). This position is calculated based on the difference between the initial load position and the average radial load multiplied by the spring rate ($K_T$) of the tire T under test.

$$TOP = ILP - K_T(ARL) \qquad (1)$$

Once the target offset position is determined, the load wheel drive 30 is commanded to make a relative position move in the correct direction equal to the target offset position or, in other words, absolute position move to a new position target, which is the initial load position plus the target offset position.

$$NPT = (ILP + TOP) \qquad (2)$$

When this move is completed, the average radial load is recalculated with new data generated over one or more revolutions of the tire T. If the average radial load is within tolerance, the loading sequence is over. Otherwise, the corrective move sequence may be repeated until the load is within the desired tolerance. With an accurate value for the spring rate $K_T$ of the tire T, the final load may be achieved on the initial move or after the first corrective move.

When the final load move has been completed, the servo control system may be used to maintain the final load position eliminating the need for a brake.

When loading the first tire of a new tire type it will be necessary to modify the sequence of operations since there is no historical load set point position established. One possibility is to use prior art methods to load the first tire. Alternatively, the load wheel may be advanced at a slower constant velocity, about one inch per second until the control system detects an instantaneous load of about 100 pounds force. At this point, the load wheel advancement is stopped and the average radial load is calculated with data generated during one or more revolutions of the tire T. If the spring rate $K_T$ of the tire T is already known, the load correction move can be made in the same manner as previously described. If the spring rate $K_T$ is not known, a second move of about 0.5 inches is commanded. Based upon a typical spring rate of about 1000 pounds per inch for passenger tires, the average radial load will increase by an additional 500 pounds force. The distance for the second move can be increased or decreased, when the load reading of the tire makes it necessary to use a smaller or larger second move.

During operation, tire T is brought into the tire uniformity machine 10 along conveyor 16. Once the tire T is in registry with the chuck assembly 20, the tire T is chucked and rotated by the motor 23. The load wheel 25 is then brought in to contact with the periphery of the tire T, such that it rotates with tire T. Once the tire T is properly loaded by the load wheel 25, the load cells 40 associated with the load wheel 25 measure forces (f(t)) transmitted from the tire T to the load wheel 25 and relay this information as shown schematically to controller 63.

The controller 63 includes the necessary hardware, software and memory for receiving inputs and generating control signals to various components of the machine 10. Indeed, the measured forces along with other measurements made by the tire uniformity machine 10, allow the controller 63 to assess the characteristics of the tire T and make corrections as necessary. The controller 63 may be any controller used in connection with the operation of a tire uniformity machine and generally may include a programmable logic controller or processor having inputs and outputs for receiving respectively for receiving information from the tire uniformity machine's components and transmit control signals to control operation of the tire uniformity machine 10. In the present example, controller 63 communicates with a servo drive controller, generally indicated at 84. To that end, drive controller 84 has at least one output and at least one programmable input which will be described more completely below.

The load wheel drive assembly of U.S. Pat. No. 6,578,275 is advantageous, but is difficult to implement in existing tire uniformity machines because multiple mechanical components need to be replaced and the software controls and the loading sequence must be changed. In some existing tire uniformity machines, it is not possible to change the software and load sequence making it impossible to retrofit the drive assembly shown in U.S. Pat. No. 6,578,275 in these systems.

To accommodate the load wheel drive assembly used in U.S. Pat. No. 6,578,275, the chain sprocket must be removed from the output shaft of the existing right angle gear box 32. Then, the existing right angle gear box, DC motor, and brake must be removed. The casting support 34 for the gear box is removed to access the gear's chain sprocket 35 which is removed. The screw chain sprocket 36 and chain 37 for the ball screw nut must be removed. Once all of these components are removed, a timing belt and timing belt sprocket for the screw are installed. An adapter assembly is installed in place of the existing right angle gear box 32. And a timing belt pulley is installed on the output shaft. The support casting with adapter assembly is attached to the tire uniformity machine frame 11. The servo motor is mounted to an adapter assembly and the timing belt is positioned between sprockets. After which, the timing belt is tensioned by moving the adapter assembly and making use of slots in the casting. Removing and replacing the components is time consuming and labor intensive. It is, therefore, desirable to provide a system that may be more easily retrofit to existing machines.

With reference to FIGS. 1-4 the improved load wheel drive system may be retrofit to existing load wheel drives in the following manner. The existing DC motor and brake are removed from the right angle gear box 32, and a servo motor 31 is attached. It may be necessary to use an adapter 38 (FIG. 3) to account for a change in the motor mounts used with the DC and servo motors. As will be appreciated, if necessary, the gear box itself may be replaced with mounts acceptable for servo motor 31. When using an adapter 38, it may be necessary to provide a shaft extension 39 (FIG. 3) for the servo motor 31 due to the thickness of the adapter 38 and allow for a change in the shaft diameter of the servo motor 31 to the shaft diameter required by the gear box 32.

Figure 4:
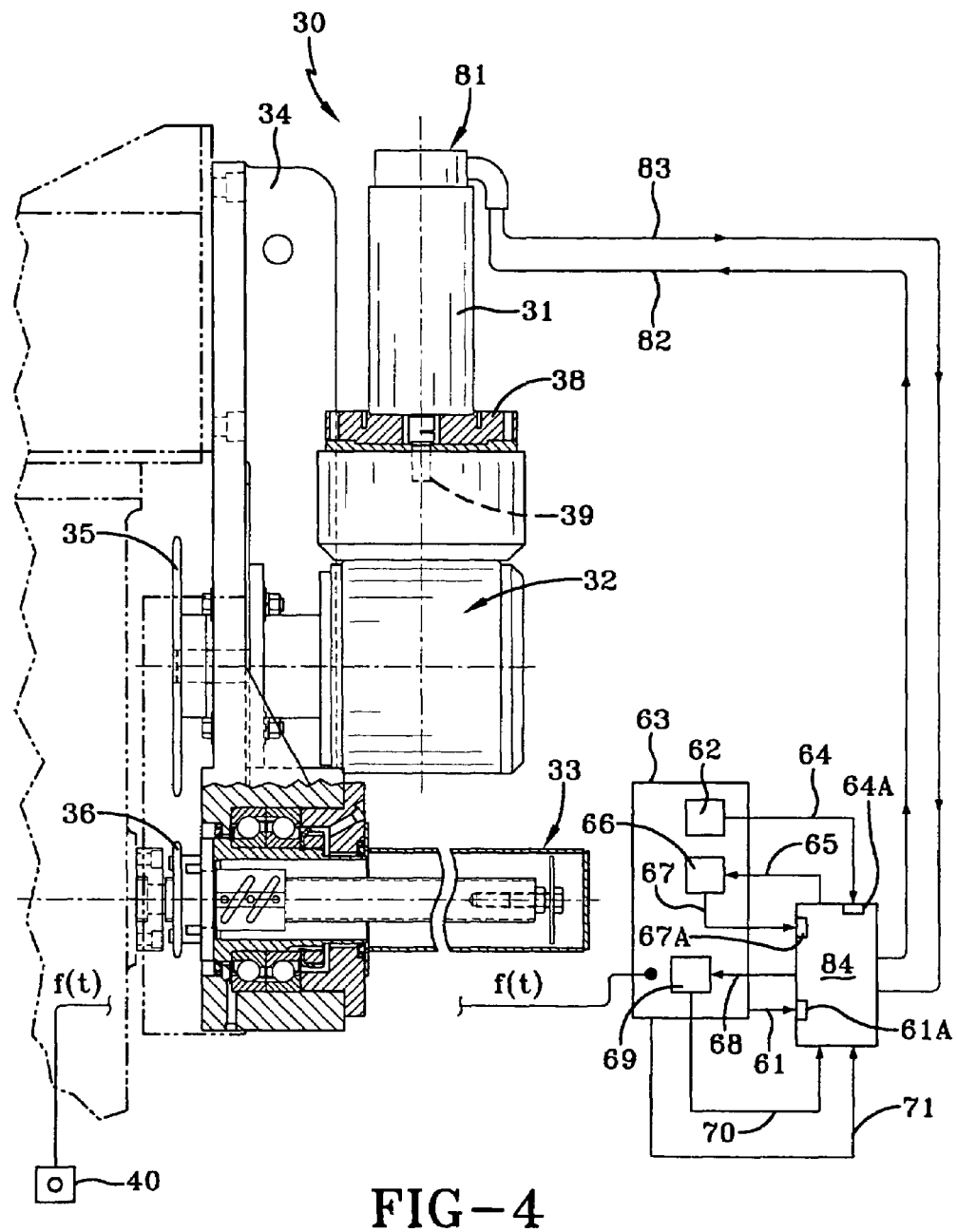
FIG. 4 is a partially schematic side elevational view similar to FIG. 3.

While existing load wheel drives use the mechanical brake whenever motion of the load wheel carriage is not desired, the brake may be omitted in the present system. In particular, as best shown in FIG. 4, the servo drive controller 84 may be provided with programmable digital inputs that can be used in conjunction with controller 63 to control a variety of functions. One suitable drive motor 31 is the Kollmorgen ServoStar 300/600 series servo drive or equivalent. One of the programmable inputs is programmed to switch the operating mode of the drive motor 31 from its primary mode of operation to a secondary mode of operation. The primary mode of operation is programmed for analog velocity control, and the secondary mode is programmed for position control, as described above. Consequently, by using the velocity control mode as the primary mode, the servo drive motor 31 may be retrofit to an existing system and operate without changing the drive control software. Without changing the software, the load wheel is advanced with the drive motor 31 operating in analog velocity control mode until proper loading of the tire T is achieved. Then, drive controller 84 switches to position control causing the servo motor 31 to hold the desired loading position without a mechanical brake.

Optionally, software for position control may be installed and the servo-drive operated in a position control mode. In this way, the system can achieve the increased speeds associated with the position control process without having to rebuild the load drive assembly.

The drive motor 31 (FIG. 4) includes one or more feedback sensors 81 that communicate with drive controller 84 via a motor cable 82 and feedback cable 83. In this application a Kollmorgen ServoStar 600 drive controller number S60300 and a Kollmorgen ServoStar motor number MT328A1-M2C1 with multi-turn encoder feedback was found suitable. Other drive controllers, servo motors, and feedback encoders can be used.

In accordance with the concepts of the present invention, in the embodiment depicted in FIG. 4, the drive controller 84 is powered as long as there are no emergency stop conditions on the tire uniformity machine 10 controller 63.

After an emergency stop is reset, controller 63 supplies a 24 VDC control power, schematically shown at 71, to the drive controller 84 causing it to boot-up. The drive controller 84 closes the RTR (ready to operate) contact, schematically represented at 68, after it has successfully completed the internal boot-up cycle. The RTR contact output 68 is used to energize a 3-phase motor contact 69, within controller 63, that provides 460 VAC 3-phase power, schematically represented at 70, to the drive controller 84 which in turn produces an internal DC bus voltage of about 680 DC that is transmitted to the servo drive 31 via cable 82. The drive controller 84 is programmed to activate (open) a digital output 65, which energizes a DC relay 66, within controller 63, when the internal DC bus voltage exceeds a minimum operational threshold. As a result, the normally open contact on relay 66 is closed and provides a 24 VDC signal 67 to the input 67A (enable) on the drive.

When the enable relay 62 is de-energized, a normally closed contact provides a 24 VDC signal 64 to digital input 64A on the servo drive controller. The result is the servo drive controller 84 is in position control mode with the task of maintaining the current motor position. This is the function that was previously provided by the electronically released mechanical brake. In other words, the servo motor holds the position without the need for a mechanical brake.

When the enable relay 62 is energized, the normally closed contact opens removing the 24 VDC signal 64 to digital input 64A. The result is the drive controller 84 is in analog velocity mode being commanded to move the load wheel carriage 26 at the analog set point speed 61, communicated from the controller 63 to the servo controller 84 at input 61A.

Many servo motors are capable of speeds of 6,000 rpm or more. In order to prevent software changes to the existing controller 63, the drive 31 is programmed to scale analog set point speed 61 to give the same scale factor that existed in the DC drive motor. The drive 31 may be given a larger scale factor to increase motor speed and improve cycle time.

Other digital inputs may be provided on drive controller 84, and can be programmed for a variety of functions. These include but are not limited to: a) stopping motion using over travel limit switches; b) jogging the location of the load wheel while in position control mode; c) disabling the servo drive; and d) provide an alternative analog speed scaling. For example, controller 63 may activate the alternate scale input 61A with an alternate scale to retract the loadwheel at a higher speed. In this way, an existing tire uniformity machine controller 63 could provide a shorter cycle time. It will be appreciated that any savings in cycle time is multiplied by the number of tires being tested and is of great value.

In light of the foregoing, it should thus be evident that a load wheel drive according to the concepts of the present invention substantially improves the art. While, in accordance with the patent statutes, only the preferred embodiment of the present invention has been described in detail hereinabove, the present invention is not to be limited thereto or thereby. It will be appreciated that various modifications may be made to the above-described embodiment without departing from the spirit of the invention. Therefore, to appreciate the scope of the invention, reference should be made to the following claims.

What is claimed is:

1. A load wheel drive assembly that is retrofit to a conventional load wheel drive having a gear box and ball screw assembly connected to each other by a chain, the load wheel drive assembly comprising: a servo motor; an adapter plate fastenable to the gear box on one side and fastenable to the servo motor on the other side; and wherein said servo motor is switchable between analog velocity control adapted to drive the motor at a setpoint velocity and a fixed position control adapted to maintain a current position of the load wheel; an enable relay connected to said servo drive, said enable relay having an energized state and a de-energized state, wherein said energized state switches said servo-drive to the analog velocity control, and wherein said de-energized state switches said servo drive to the fixed position control.

2. A method of retrofitting a servo motor to a load wheel drive having a DC motor, a gear box, and a controller the method comprising: removing the dc motor; attaching an adapter to the gear box, providing receivers on the adapter that align with receivers on the servo motor; fastening the servo motor to the adapter at said aligned receivers; connecting the servo motor to the controller through a drive controller at a programmable input on the drive controller; and programming said programmable input to cause the servo motor to hold a position if the controller is de-energized.

3. A load wheel drive assembly for an existing tire uniformity machine having a load wheel that is driven by a ball nut connected to a gear box, the load wheel drive assembly comprising: a servo motor attachable to said gear box and operable therewith to control movement of the load wheel, said servo motor having a programmable input associated therewith and in communication with a controller, said controller having a relay in communication with said programmable input and adapted to switch said servo motor between a velocity mode and a position mode of operation.

4. The load wheel drive assembly of claim 3 wherein when said relay is energized said servo motor is in the velocity mode, and wherein de-energizing said relay switches said servo motor to the position mode.

5. A load wheel drive assembly that is retrofit to a conventional load wheel drive having a gear box that interconnects with a ball screw used to drive a load wheel, wherein movement of the load wheel is controlled by a controller that receives force feed back from at least one load cell associated with the load wheel, the load wheel drive assembly comprising: a servo motor attachable to the gear box and operatively connected therewith; a drive controller electrically connected to the controller and said servo motor, said drive controller having at least one programmable input adapted to switch operation of said servo motor between analog velocity control and position control, wherein said servo motor drives the load wheel at an average velocity when in said analog velocity control mode and wherein said servo motor maintains a selected position when in said position control mode; wherein said programmable input is in communication with the controller and is programmed to switch to position control upon receiving a signal from the controller indicating that the load wheel is in a selected position, whereby said servo motor being in a position control mode holds the selected position.

6. The load wheel drive assembly of claim 5, wherein said drive controller automatically switches to position control when it is de-energized.

7. The load wheel drive assembly of claim 5 further comprising a second programmable input in communication with the controller and the servo motor, said programmable input being programmed to stop motion of the load wheel upon receiving a signal from a limit switch.

8. The load wheel drive assembly of claim 5 further comprising a second programmable input in communication with the controller and the servo motor, said programmable input being programmed to jog the location of the load wheel while in position control mode based on input received from the controller.

9. The load wheel drive assembly of claim 5 further comprising a second programmable input in communication with the controller and the servo motor, said programmable input being programmed to disable the drive in response to an input from the controller.

10. The load wheel drive assembly of claim 5, wherein said drive controller, when in said analog velocity mode, receives an analog set point speed from the controller, wherein said drive controller is programmed to scale its output to the servo motor to produce the analog set point speed at said servo motor.

11. The load wheel drive assembly of claim 10 further comprising a second programmable input programmed to provide a different analog speed scaling, wherein said drive controller is programmed to selectively switch to said different analog speed scaling to produce a different analog speed at said servo motor.

12. The load wheel drive assembly of claim 11, wherein said different analog speed scaling is adapted to produce a greater speed than said analog set point speed.

13. A method of positioning a load wheel in a tire uniformity machine to load a tire for testing, the method comprising providing a drive assembly including a drive motor and a drive controller, electrically connected to each other, said drive controller being adapted to switch between analog velocity control and position control; moving the load wheel with the drive motor using analog velocity control; and switching to position control to cause said motor to maintain a selected position of said load wheel without a mechanical brake.

* * * * *